United States Patent [19]

Djupsjöbacka

[11] Patent Number: 4,798,429
[45] Date of Patent: Jan. 17, 1989

[54] OPTOELECTRIC CONNECTION DEVICE

[75] Inventor: Anders G. Djupsjöbacka, Solna, Sweden

[73] Assignee: Telefonaktiebolaget LM Ericsson, Stockholm, Sweden

[21] Appl. No.: 809,936

[22] Filed: Dec. 17, 1985

[30] Foreign Application Priority Data

Feb. 11, 1985 [SE] Sweden .................................. 8500615

[51] Int. Cl.$^4$ .............................................. G02B 6/28
[52] U.S. Cl. ................................. 350/96.14; 350/96.16
[58] Field of Search ................. 350/96.12, 96.13, 96.14

[56] References Cited

U.S. PATENT DOCUMENTS 4,120,560  10/1978  Baues et al. ........................ 350/96.14
4,196,964   4/1980  Papuchon ........................... 350/96.14

FOREIGN PATENT DOCUMENTS 1411720  10/1975  United Kingdom .

OTHER PUBLICATIONS

Electronics Letters, vol. 12 No. 22, 28th Oct., 1976, R. V. Schmidt & L. L. Buhl "Experimented 4×4 Optical Switching Network," pp. 575–577.

Primary Examiner—John D. Lee
Assistant Examiner—Robert E. Wise
Attorney, Agent, or Firm—Roberts, Spiecens & Cohen

[57] ABSTRACT

An Optoelectric connection device (3a) for coupling transmission (28) and reception units (4) to a line (2) for optical information transmission. The device includes a plate (11) of optoelectric material having two directional couplers (12,13) connectable to the line (2) and a modulating directional coupler (14). A signal at the input (18,18a) for the line is cross-coupled in the first coupler (13) to the reception unit (4). A lightwave from the source (28) is modulated in the modulator (14) to form an output signal, which is cross coupled in the second coupler (12) to the output (23,23a) for the line. If the directional couplers (12,13a) are disabled, a signal at the input (18,18a) passes via the couplers directly to the output (23,23a). The connection device has a reserve input (19,19a) and a reserve output (24,24a) which are utilized for fitting the connection device into the line (2) without interrupting signal transmission on the line (2). The device (3a) has negligible cross talk between the input (18,18a) and output (23,23a).

9 Claims, 3 Drawing Sheets

OPTOELECTRIC CONNECTION DEVICE

FIELD OF THE INVENTION

The invention relates to an optoelectric connection device, preferably for enabling the connection of transmission and reception units to a transmission conductor of the fibre optic type, without interrupting traffic in progress.

BACKGROUND

In systems for optical information transmission, there is the need of coupling transmission and reception means to the system transmission line when the line is in operation. Connection devices, such as described in U.S. Pat. No. 4,252,402, can be coupled in at desired points along the line in such a case. During the time coupling is in progress, the traffic on the line must be interrupted, and this can result in large costs. To avoid these costs, a large number of connection devices are already coupled in beforehand when the transmission line is constructed, and are often considerably more than the line can serve at the same time. This is also expensive, and it is difficult to anticipate suitable connection points along the transmission line. The known connection devices further have the disadvantage that possible crosstalk in the optoelectric directional switches included in the connection devices allow the entire crosstalk signal to pass out from the device.

SUMMARY OF THE INVENTION

The problems mentioned are solved in accordance with the invention by a connection device with inputs and outputs for the transmission line, and reserve inputs and outputs which may be utilized when the device is coupled into a line without interrupting the operation. The device is characterized in that the connection device comprises first and second directional couplers each having two respective inputs and outputs, said device having an input for a line and at least one reserve input both connectable to the inputs of said first directional coupler, said device further having an output for the line and at least one reserve output both connectable to the outputs of said second directional coupler, optical connection means between a first output of the first directional coupler and a reception means and further optical connection means between a first input of the second directional coupler and a transmission means, a second output of the first directional coupler being optically connected to a second input of the second directional coupler and means for selectively enabling or disabling the directional couplers together or individually.

BRIEF DESCRIPTION OF THE DRAWINGS

A preferred embodiment of the invention will be described in connection with the appendedd drawing, in which FIG. 1 schematically illustrates a communication network with a plurality of connected units.

DETAILED DESCRIPTION OF A BEST MODE FOR CARRYING OUT THE INVENTION

Figure 1:
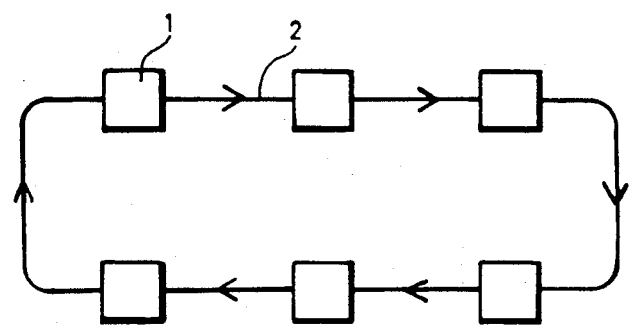
Figure 2:
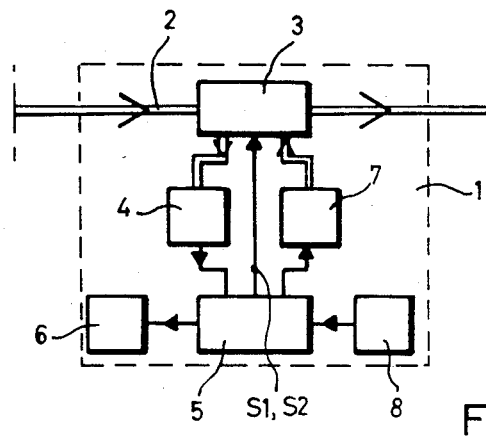
FIG. 2 is a block diagram of subscriber equipment, FIG. 3 schematically illustrates the format of a message word.
Figure 3:
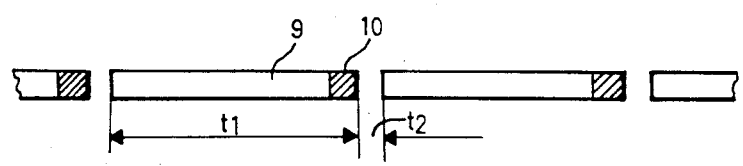

An optoelectric connection device in accordance with the invention will now be described in detail below in connection with a known system for optical information transmission, the construction of which is generally illustrated in FIG. 1. Subscribers' equipment 1 are connected to each other via a line 2, which is a closed, optical fibre loop for one-way optical information transmission. FIG. 2 is a block diagram of the subscriber equipment 1 which, in a manner known per se, receives all the information from the line 2, reads the part of the information addressed to the subscriber and sends the remaining part of the information out on the line. A connection device 3 receives optical signals from the line 2, which are fed to a reception means 4 by an optical/electrical converter, such as a photodiode. The reception means is electrically connected to a central unit 5, in which the part of the information addressed to the subscriber is read and sent to a display means 6, for example, a video display screen or a printer. The remaining part of the information is fed by the unit 5 to a transmission means 7 by an electrical/optical converter, for example, a laser generator with a modulator. The transmission means 7 sends the optical information to the connection means 3, through which the information is once again sent out to the line 2. The subscriber equipment 1 has a writing means 8, for example a keyboard, connected to the central unit 5 for being able to send its information. The information from the writing means is read by the unit 5 and fed via the transmitter means 7 and connection means 3 to the line 2. The information is transmitted as binary words, which are put together to form the message word 9 as illustrated in FIG. 3. Each message word includes a given number of binary digits, bits, which are sent during a definite time interval t1 and the message words are separated by a time slot t2. At the beginning of each message word there is a synchronizing word 10 which, in a manner known per se, is detected in the central unit 5 for resetting a clock in this unit. All units 5 in the respective subscribers' equipment 1 on the line 2 can be mutually synchronized so that they can transmit and receive the message words 9 at the same rate.

Figure 4:
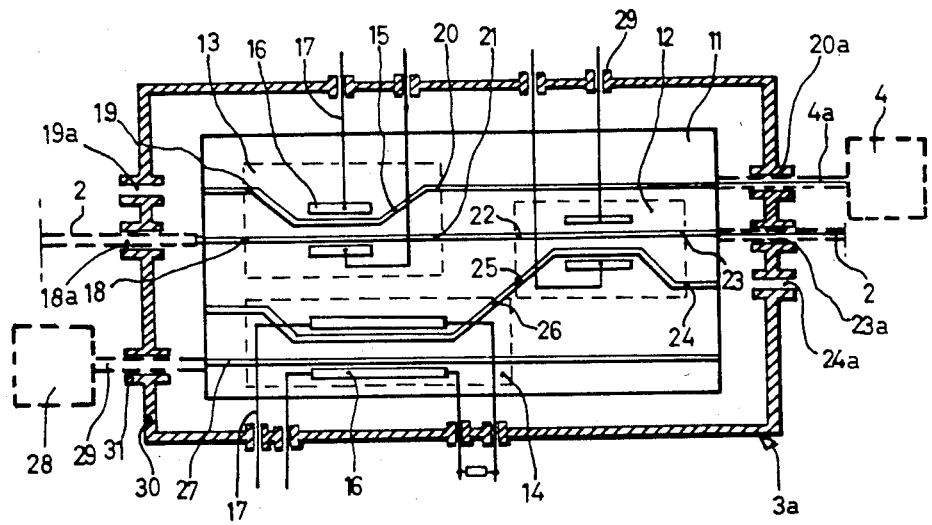
FIG. 4 is an embodiment of an optoelectric connection device.

As previously mentioned, it is often desired to couple a new subscriber into a system for information trnsmission, e.g. the system as described above, after the system has been put into use. It is desirable that coupling may be made anywhere along the line without the information transmission being interrupted, and without the line needing to be provided with a connection device beforehand for such coupling. In FIG. 4 there is illustrated an embodiment of an optoelectric connection means 3a in accordance with the invention, which enables such a desired coupling. The connection means 3a includes a plate 11 of optoelectric material, e.g. lithium niobate. The plate 11 has three optical directional couplers 12, 13 and 14, in dotted outline in FIG. 4. The illustrated directional couplers each include two optical waveguides 15 of a material such as titanium diffused into the plate surface, as well as electrodes 16 on the plate which are electrically connected to wires 17. A detailed description of the construction and function of optical directional couplers is to be found, for example in an article in IEEE Transaction on circuits and systems, Vol. Cas-26, No. 12 December 1979 pp. 1099–1108, Ronald V. Schmidt and Rod C. Alferness: "Directional coupler switches, modulators and filters using alternating techniques". The directional coupler 13 has an input 18 for the line 2 and a reserve input 19. One output 20 of the directional coupler 13 is connected to the reception means 4 by an optical fibre 4a and its other output 21 is connected to an input 22 on the directional coupler 12. The directional coupler 12 has an output 23 for the line 2, a reserve output 24 and an input 25 connected to an output 26 on the directional coupler 14. The latter has an inut 27 connected to a laser generator 28 by an optical fibre 29, and together with the laser generator constitutes the transmitter means 7, which was described in connection with FIG. 2 In a manner known per se, the plate 11 of optoelectric material is enclosed in a protective casing 30. The casing 30 has an input 18a for the line 2 and a reserve input 19a for connection to the respective optical inputs 18 and 19 on the directional coupler 13, and also an output 23a and a reserve output 24a for connection to the respective optical outputs 23 and 24 of the directional coupler 12. Additionally the casing has an input 31 for the laser generator 28 and an output 20a for the reception means 4, as well as leads-through 29 for the wires 17.

From the above-mentioned article on directional couplers, it will be seen that a lightwave which is connected to one waveguide in a directional coupler can entirely or partially migrate over to the other waveguide by coupled oscillators. The process can be controlled by an electrical voltage connected to the electrodes so that a desired distribution of the lightwave is obtained between the waveguides of the directional coupler. In the present invention, there are only used the two extreme states of the directional couplers namely, the parallel state and the cross coupling state. The directional couplers 12, 13 and 14 are constructed in the embodiment so that they are in their parallel coupling state if the electrodes 16 are without voltage. A lightwave, with the wavelength used in the system, which is incident at the input 18, for example, thus leaves the directional coupler 13 via the output 21. In the cross coupling state, the lightwave is coupled in its entirety over to the other waveguide, and leaves the directional coupler via the output 20 if a given voltage is applied across the electrodes 16.

Figure 5:
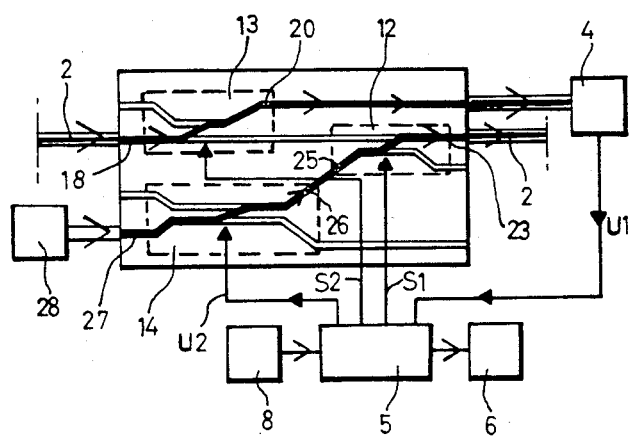
FIG. 5 is an example of controlling the signals by a connection device according to FIG. 4 and FIGS. 6a–d illustrate the coupling of a connection device into a transmission line in operation.

There is schematically illustrated in FIG. 5 how the above-described connection device is normally used in a system for information transmission. The information coming in on line 2 is coupled by the directional coupler 13 via its output 20 to the reception means 4, which sends corresponding electrical signal $U_1$ to the central unit 5. As already described, in relation to FIG. 2 this is connected to display means 6 and printer 8. Outgoing electrical signals $U_2$ from the central unit control the directional coupler 14 so that the lightwave of constant intensity from the laser generator 28 is modulated. The binary optical signals thus formed are once again connected to the line 2 via the output 26 of the directional coupler 14 to the input 25 of the directional coupler 12 and further to its output 23. The directional couplers 12 and 13 are in cross coupling state due to the control signals $S_1$ and $S_2$, which they obtain from the central unit 5, and which is also indicated in FIG. 2.

Figure 6A:
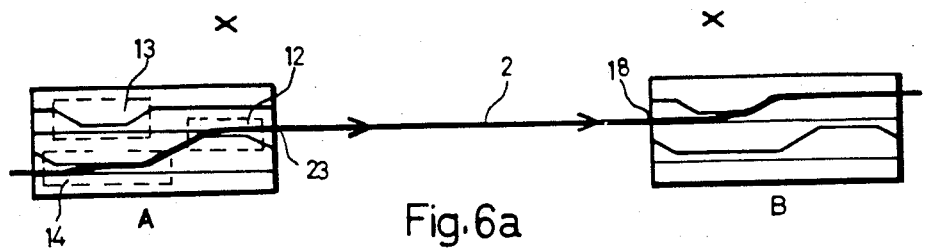
Figure 6B:
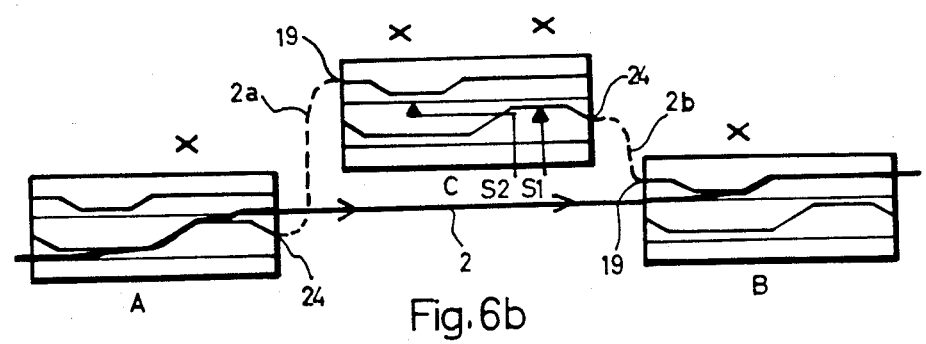
Figure 6C:
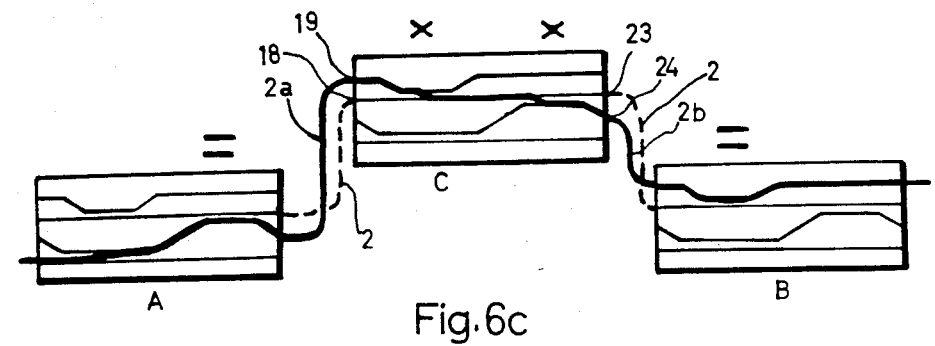
Figure 6D:
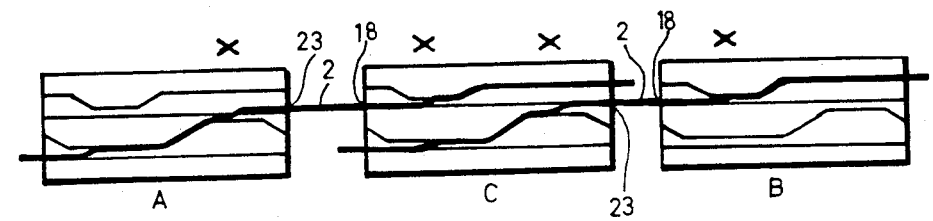

In FIGS. 6a–d it is shown how the connection device is used when a new subscriber is coupled into the line 2. The path of the information transmitted by optical signals is denoted in the Figure by a heavy full line. Above the directional couplers 12 and 13 it is indicated by a cross that the directional coupler is in its cross coupling state and by two parallel lines that it is in its parallel coupling state. FIG. 6a illustrates the connection devices of two subscribers A and B being connected to each other by the line 2. Subscriber A sends optical information signals in a manner described above, which leave the connection device via the output for the line 23 on the directional coupler 12. The subscriber B receives, as described above, these signals with its connection means via the input for the line 18 on the directional coupler 13. FIG. 6b illustrates how a connection device for a new subscriber C is coupled in. A reserve line 2a connects the reserve output 24 of subscriber A with the reserve input 19 of subscriber C and a reserve line 2b connects the reserve output 24 of this subscriber C with the reserve input 19 of subscriber B. The electrodes for the directional couplers 12 and 13 at subscriber C are connected electrically in a way unillustrated in the figure and are put in the cross coupling state by control signals $S_1$ and $S_2$. The optical signal transmission continues to take place via the normal line 2. How the reserve lines 2a and 2b are placed into use is illustrated in FIG. 6C. The directional coupler 12 at subscriber A and the directional coupler 13 at subscriber B are put in the parallel coupling state so that the optical signals are transferred via the reverse lines 2a and 2b and the connection device at subscriber C. Here, the optical wavelength between the subscribers A and B has been changed, the central unit 5 at subscriber B being synchronized as described in connection with FIG. 3. After coupling in the reserve line, the ordinary line 2 is broken and its free ends are connected to the input for the line 18 and the utput for the line 23 at subscriber C. As illustrated in FIG. 5 the reception means 4, central unit 5 and laser generator 28 are subsequently connected to the connection device at the subscriber C. It is illustrated in FIG. 6d how the normal line 2 is placed into use again and how the new subscriber C can participate in the traffic. This takes place by the directional coupler 12 at subscriber A and the directional coupler 13 at subscriber B being returned to the cross coupling state. The optical signals are thus transferred from subscriber A at the output for the line 23 via line 2 to the input for the line 18 at subscriber C. This subscriber can send information further, as described in connection with FIG. 5, after the central unit 5 has been synchronized with subscriber A. The optical signals are transferred from the output of the line 23 at subscriber C via the line 2 to the input of the line 18 at subscriber B, which is again synchronized with subscriber A. The connection device 3a in the embodiment described above has both the directional couplers 12 and 13 connected to the line 2 on the same plate 11 of optoelectrically active material. The directional coupler 14 used as a modulator for the laser generator 28 is also on the same plate. It is of course possible to have the directional couplers on separate substructures and to connect them to each other by optical fibres in a manner known per se. In this way smaller and thus cheaper plates of optoelectric material may be used. However, the optical signals are attenuated at the connection between the optical fibre and the waveguide on the plate, which puts increased demands on optical signal detection and signal amplification.

The directional couplers 12 and 13 are constructed, as mentioned, so that they are in their parallel coupling state when they are without voltage. According to the described embodiment, these directional couuplers are connected together so that a lightwave on the input 18 from the line 2 passes the coupler 13 to the input 22 of the coupler 12 and is taken once again via the output 23 out to the line if the couplers are without voltage. This brings with it the advantage that an incoming signal on theline 2 is not interrupted, but continues on the line if it happens that the subscriber is subjected to a voltage failure. The directional coupler according to the illustrated embodiment furthermore has the advantage that crosstalk between the input 18 and the output 23 for the line is very small. It may be accompanied with difficulties to manufacture and control the directional couplers 12 and 13 so that the signal on the input is cross coupled entirely. If the directional coupler 13 in its cross coupled state has a certain amount of crosstalk a weak crosstalk signal supplied at the output 21 to the input 22 of the directional coupler 12. This directional coupler is normally in its cross coupling state however, so that the crosstalk signal is coupled over to the reserve output 24 and does not reach the outgoing line 2.

What is claimed is:

1. An optoelectric connection device for connecting transmission and reception means to a line for optical information transmission, said device comprising first and second directional couplers each having two respective inputs and outputs, said device having an input for a line and at last one reserve input both connected to the inputs of said first directional coupler, said device further having an output for the line and at least one reserve output both connected to the outputs of said second dirctional coupler, optical connection means between a first output of the first directional coupler and a reception means and further optical connection means between a first input of the second directional coupler and a transmission means, a second output of the first directional coupler being optically connected to a second input of the second directional coupler and means for selectively enabling or disabling the directional couplers together or individually.

2. An optoelectric connection device as claimed in claim 1 wherein in the disabled state of both couplers said line is connected through the device from its input for the line to its output for the line and in the enabled state of both couplers the input for the line is connected through said first coupler to the reception means while said transmission means is connected through the second coupler to the output for the line, whereass with only the first coupler enabled, said input for the line is connected through the first directional coupler to the reception means and said transmission means is connected through the second directional coupler to said reserve output, and if only the second directional coupler is enabled, said reserve input is connected through the first directional coupler to the reception means and said transmission means is connected to the second directional coupler and to the output for the line.

3. An optoelectric connection device as claimed in claim 2 comprising a common substructure of optoelectric material on which said directional couplers are mounted.

4. An optoelectric connection device as claimed in claim 3 further comprising third directional coupler means which can be selectively enabled for modulating a signal fed from said transmission means and supplying said signal to the first input of the second directional coupler.

5. An optoelectric connection device as claimed in claim 4 wherein said transmission means comprises a coherent light source and said signal which is modulated in said third directional coupler is a lightwave.

6. An optoelectric connection device as claimed in claim 2 wherein each directional coupler comprises two waveguides connected between the respective inputs and outputs of the directional coupler, and two electrodes operatively positioned with respect to the waveguides, and means for selectively supplying voltage to said electrodes of each directional coupler to selectively enable the respective coupler.

7. An optoelectric connection device as claimed in claim 1 comprising a common substructure of optoelectric material on which said directional couplers are mounted.

8. An optoelectric connection device as claimed in claim 7 further comprising third directional coupler means which can be selectively enabled for modulating a signal fed from said transmission means and supplying said signal to the first input of the second dirctional coupler.

9. An optoelectric connection device as claimed in claim 8 wherein said transmission means comprises a coherent light source and said signal which is modulated in said third directional coupler is a lightwave.

* * * * *